United States Patent
Tian

(10) Patent No.: US 12,531,113 B2
(45) Date of Patent: Jan. 20, 2026

(54) SINGLE-LOOP MEMORY DEVICE, DOUBLE-LOOP MEMORY DEVICE, AND ZQ CALIBRATION METHOD

(71) Applicant: CHANGXIN MEMORY TECHNOLOGIES, INC., Hefei (CN)

(72) Inventor: Kai Tian, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 124 days.

(21) Appl. No.: 18/524,136

(22) Filed: Nov. 30, 2023

(65) Prior Publication Data

US 2024/0096409 A1   Mar. 21, 2024

Related U.S. Application Data

(63) Continuation of application No. PCT/CN2022/123916, filed on Oct. 8, 2022.

(30) Foreign Application Priority Data

Jun. 22, 2022  (CN) .......................... 202210716325.4

(51) Int. Cl.
*G11C 11/4096* (2006.01)
*G11C 11/4093* (2006.01)
*H03K 19/00* (2006.01)

(52) U.S. Cl.
CPC ...... *G11C 11/4096* (2013.01); *G11C 11/4093* (2013.01); *H03K 19/0005* (2013.01); *G11C 2207/2254* (2013.01)

(58) Field of Classification Search
CPC ............ G11C 11/4096; G11C 11/4093; G11C 2207/2254; G11C 29/50008;
(Continued)

(56) References Cited

U.S. PATENT DOCUMENTS

| | | | |
|---|---|---|---|
| 10,276,220 | B2 | 4/2019 | Jeon et al. |
| 10,896,704 | B2 | 1/2021 | Johnson et al. |

(Continued)

FOREIGN PATENT DOCUMENTS

| | | |
|---|---|---|
| CN | 108133724 A | 6/2018 |
| CN | 111009279 A | 4/2020 |
| CN | 111650991 A | 9/2020 |

OTHER PUBLICATIONS

International Search Report cited in PCT/CN2022/123916 mailed Dec. 22, 2022, 12 pages.

(Continued)

*Primary Examiner* — Sultana Begum
(74) *Attorney, Agent, or Firm* — Syncoda LLC; Feng Ma

(57) ABSTRACT

The present disclosure provides a single-loop memory device, a double-loop memory device, and a ZQ calibration method. The single-loop memory device includes: a master chip and a plurality of slave chips each provided with a first transmission terminal and a second transmission terminal, where the second transmission terminal of the master chip is connected to the first transmission terminal of the slave chip of a first stage, and the second transmission terminal of the slave chip of each stage is connected to the first transmission terminal of the slave chip of a next stage; and the master chip is provided with a first signal receiver, and the slave chip is provided with a second signal receiver.

6 Claims, 6 Drawing Sheets

(58) Field of Classification Search
CPC ... G11C 29/022; G11C 7/1057; G11C 7/1084; H03K 19/0005; Y02D 10/00
See application file for complete search history.

(56) References Cited

U.S. PATENT DOCUMENTS

| | | |
|---|---|---|
| 11,101,802 B2 | 8/2021 | Choi |
| 12,277,992 B2 * | 4/2025 | Tian .................... G11C 7/1048 |
| 2016/0012879 A1 | 1/2016 | Eom et al. |
| 2019/0052268 A1 | 2/2019 | Lee et al. |
| 2023/0420012 A1 * | 12/2023 | Tian .................... G11C 11/4093 |

OTHER PUBLICATIONS

Extended European search report in U.S. Appl. No. 22/924,573, mailed on Jul. 16, 2024.

* cited by examiner

SINGLE-LOOP MEMORY DEVICE, DOUBLE-LOOP MEMORY DEVICE, AND ZQ CALIBRATION METHOD

CROSS-REFERENCE TO RELATED APPLICATIONS

This is a continuation of International Patent Application No. PCT/CN2022/123916, filed on Oct. 8, 2022, which claims the priority to Chinese Patent Application No. 202210716325.4, titled "SINGLE-LOOP MEMORY DEVICE, DOUBLE-LOOP MEMORY DEVICE, AND ZQ CALIBRATION METHOD" and filed on Jun. 22, 2022. The disclosures of International Patent Application No. PCT/CN2022/123916 and Chinese Patent Application No. 202210716325.4 are incorporated herein by reference in their entireties.

TECHNICAL FIELD

The present disclosure relates to, but is not limited to, a single-loop memory device, a double-loop memory device, and a ZQ calibration method.

BACKGROUND

ZQ calibration is a very important function in a dynamic random access memory (DRAM), specifically related to whether the output impedance of an output port is accurate, and whether the termination resistance of an input port is accurate. The offset of these parameters may cause severe distortion of a signal due to impedance mismatch during transmission, and a higher signal frequency leads to greater effects of the distortion on the signal.

The number of ZQ calibration resistors required by a low power double data rate 5 (LPDDR5) has been specified in the package definition of joint electron device engineering council (JEDEC). For example, there is one ZQ calibration resistor for a DIS315 chip, and two ZQ calibration resistors for a POP496 chip. Hence, the number of the ZQ calibration resistors in the LPDDR5 is significantly less than the number of the ZQ calibration resistors in an LPDDR4.

With the increasing demand for LPDDR capacity, more and more chips need to be placed in one LPDDR package. However, each chip requires individual ZQ calibration due to individual differences. Especially for an LPDDR5 package, the number of the ZQ calibration resistors is significantly less than that in the LPDDR4, and more chips are required to share one ZQ. How to realize a plurality of chips sharing the ZQ calibration resistor for ZQ calibration is an urgent technical problem to be solved at present.

SUMMARY

An overview of the subject described in detail in the present disclosure is provided below, which is not intended to limit the protection scope of the claims.

The present disclosure provides a single-loop memory device, a double-loop memory device, and a ZQ calibration method.

A first aspect of the present disclosure provides a single-loop memory device, applied to a memory device having a single calibration resistor, and including: a master chip and a plurality of cascaded slave chips, wherein the master chip and the slave chips are commonly connected to a same calibration resistor; and the master chip and the slave chips are each provided with a first transmission terminal and a second transmission terminal, and the first transmission terminal and the second transmission terminal are configured to transmit a ZQ flag signal, wherein the second transmission terminal of the master chip is connected to the first transmission terminal of the slave chip of a first stage, and the second transmission terminal of the slave chip of each stage is connected to the first transmission terminal of the slave chip of a next stage; and a first signal receiver is provided in the master chip, and a second signal receiver is provided in the slave chip, the first signal receiver is configured to receive, by a ZQ signal terminal, a ZQ calibration command provided by a memory, the master chip starts calibration based on the ZQ calibration command, the ZQ flag signal is sent by the second transmission terminal of the master chip after the master chip completes the calibration, and the ZQ flag signal indicates that a current chip has used the calibration resistor for calibration; and the second signal receiver is configured to receive the ZQ flag signal by the first transmission terminal, the slave chip starts the calibration based on the ZQ flag signal, and the ZQ flag signal is sent by the second transmission terminal of a current slave chip after the current slave chip completes the calibration.

A second aspect of the present disclosure provides a double-loop memory device, applied to a memory device having two calibration resistors, and comprising: a first master chip, a plurality of cascaded first slave chips, a second master chip, and a plurality of cascaded second slave chips, wherein the first master chip and the plurality of cascaded first slave chips are commonly connected to a first calibration resistor, and the second master chip and the plurality of cascaded second slave chips are commonly connected to a second calibration resistor; the first master chip, the plurality of cascaded first slave chips, the second master chip, and the plurality of cascaded second slave chips are each provided with a first transmission terminal and a second transmission terminal, wherein the first transmission terminal and the second transmission terminal are configured to transmit a ZQ flag signal, the first transmission terminals and the second transmission terminals of the first master chip and the plurality of cascaded first slave chips are configured to transmit a first ZQ flag signal, and the first transmission terminals and the second transmission terminals of the second master chip and the plurality of cascaded second slave chips are configured to transmit a second ZQ flag signal; the second transmission terminal of the first master chip is connected to the first transmission terminal of a first slave chip of a first stage in the plurality of cascaded first slave chips, the second transmission terminal of a first slave chip of each stage in the plurality of cascaded first slave chips is connected to the first transmission terminal of a first slave chip of a next stage in the plurality of cascaded first slave chips, the second transmission terminal of the second master chip is connected to the first transmission terminal of a second slave chip of a first stage in the plurality of cascaded second slave chips, and the second transmission terminal of a second slave chip of each stage in the plurality of cascaded second slave chips is connected to the first transmission terminal of a second slave chip of a next stage in the plurality of cascaded second slave chips; and a first signal receiver is provided in each of the first master chip and the second master chip, and a second signal receiver is provided in each of the plurality of cascaded first slave chips and the plurality of cascaded second slave chips, wherein the first signal receiver is configured to receive, by a ZQ signal terminal, a ZQ calibration command provided by a memory, the first master chip and the second master chip start calibration based on the ZQ calibration command, the first master chip sends the first ZQ flag signal by the second transmission terminal after the first master chip completes the calibration, the second master chip sends the second ZQ flag signal by the second transmission terminal after the second master chip completes the calibration, and the first ZQ flag signal and the second ZQ flag signal indicate that a current chip has used the calibration resistors for calibration; and the second signal receiver is configured to receive the first ZQ flag signal or the second ZQ flag signal by the first transmission terminal, the first slave chip starts the calibration based on the first ZQ flag signal, the first slave chip sends the first ZQ flag signal by the second transmission terminal after the first slave chip completes the calibration, the second slave chip starts the calibration based on the second ZQ flag signal, and the second slave chip sends the second ZQ flag signal by the second transmission terminal after the second slave chip completes the calibration; wherein, the ZQ calibration command comprises a first ZQ calibration command and a second ZQ calibration command.

A third aspect of the present disclosure provides a ZQ calibration method, applied to the single-loop memory device according to the first aspect above, and including: in a command mode, obtaining a ZQ calibration command applied outside a memory device; performing a first calibration operation on a master chip in response to the ZQ calibration command; after the first calibration operation being completed, transmitting a ZQ flag signal to a slave chip of a first stage, and performing a second calibration operation on the master chip; performing the first calibration operation on the slave chip of the first stage in response to the ZQ flag signal; after the first calibration operation on the slave chip of the first stage being completed, transmitting the ZQ flag signal to a slave chip of a next stage, and performing the second calibration operation on the slave chip of the first stage until a slave chip of a last stage completing the first calibration operation; and performing the second calibration operation on the slave chip of the last stage.

A fourth aspect of the present disclosure provides a ZQ calibration method, applied to the double-loop memory device according to the second aspect above, and including: in a command mode, obtaining a first ZQ calibration command and a second ZQ calibration command applied outside a memory device; performing a first calibration operation on a first master chip in response to the first ZQ calibration command; after the first calibration operation being completed, transmitting a first ZQ flag signal to a first slave chip of a first stage, and performing a second calibration operation on the first master chip; performing the first calibration operation on the first slave chip of the first stage in response to the first ZQ flag signal; after the first calibration operation on the first slave chip of the first stage being completed, transmitting the first ZQ flag signal to a first slave chip of a next stage, and performing the second calibration operation on the first slave chip of the first stage until a first slave chip of a last stage completing the first calibration operation; performing the second calibration operation on the first slave chip of the last stage; performing the first calibration operation on a second master chip in response to the second ZQ calibration command; after the first calibration operation being completed, transmitting a second ZQ flag signal to a second slave chip of a first stage, and performing a second calibration operation on the second master chip; performing the first calibration operation on the second slave chip of the first stage in response to the second ZQ flag signal; after the first calibration operation on the second slave chip of the first stage being completed, transmitting the second ZQ flag signal to a second slave chip of a next stage, and performing the second calibration operation on the second slave chip of the first stage until a second slave chip of a last stage completing the first calibration operation; and performing the second calibration operation on the second slave chip of the last stage.

Other aspects of the present disclosure are understandable upon reading and understanding of the accompanying drawings and detailed description.

BRIEF DESCRIPTION OF THE DRAWINGS

The accompanying drawings incorporated into the specification and constituting a part of the specification illustrate the embodiments of the present disclosure, and are used together with the description to explain the principles of the embodiments of the present disclosure. In these accompanying drawings, similar reference numerals represent similar elements. The accompanying drawings in the following description illustrate some rather than all of the embodiments of the present disclosure. Those skilled in the art may obtain other accompanying drawings based on these accompanying drawings without creative efforts.

DETAILED DESCRIPTION

The technical solutions in the embodiments of the present disclosure are described below clearly and completely referring to the accompanying drawings in the embodiments of the present disclosure. Apparently, the described embodiments are merely some rather than all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

It can be known from the background that with the increasing demand for LPDDR capacity, more and more chips need to be placed in one LPDDR package. However, each chip requires individual ZQ calibration due to individual differences. Especially for an LPDDR5 package, the number of the ZQ calibration resistors is significantly less than that in the LPDDR4, and more chips are required to share one ZQ.

An embodiment of the present disclosure provides a single-loop memory device. A new control circuit is designed to realize a plurality of chips, theoretically having no quantitative limitation, sharing the ZQ calibration resistor.

Those of ordinary skill in the art should understand that many technical details are proposed in the embodiments of the present disclosure to make the present disclosure better understood. However, even without these technical details and various changes and modifications made based on the following embodiments, the technical solutions claimed in the present disclosure may still be realized. The following divisions of the various embodiments are intended for convenience of description, and are not intended to constitute any limitation to the specific implementation of the present disclosure. The various embodiments may be combined with each other in case of no contradiction.

Figure 1:
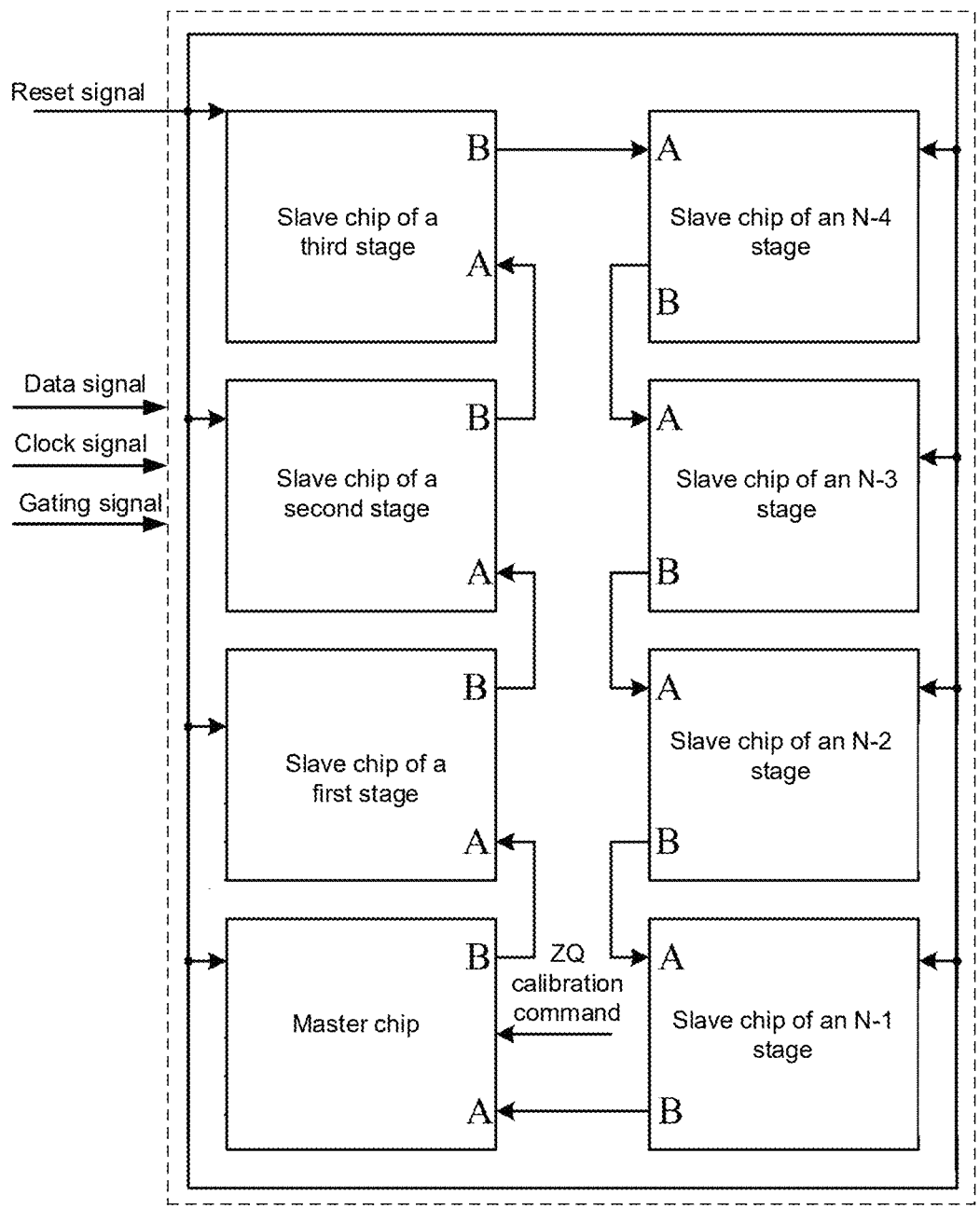
FIG. 1 is a schematic structural diagram of a first single-loop memory device according to an embodiment of the present disclosure.
Figure 2:
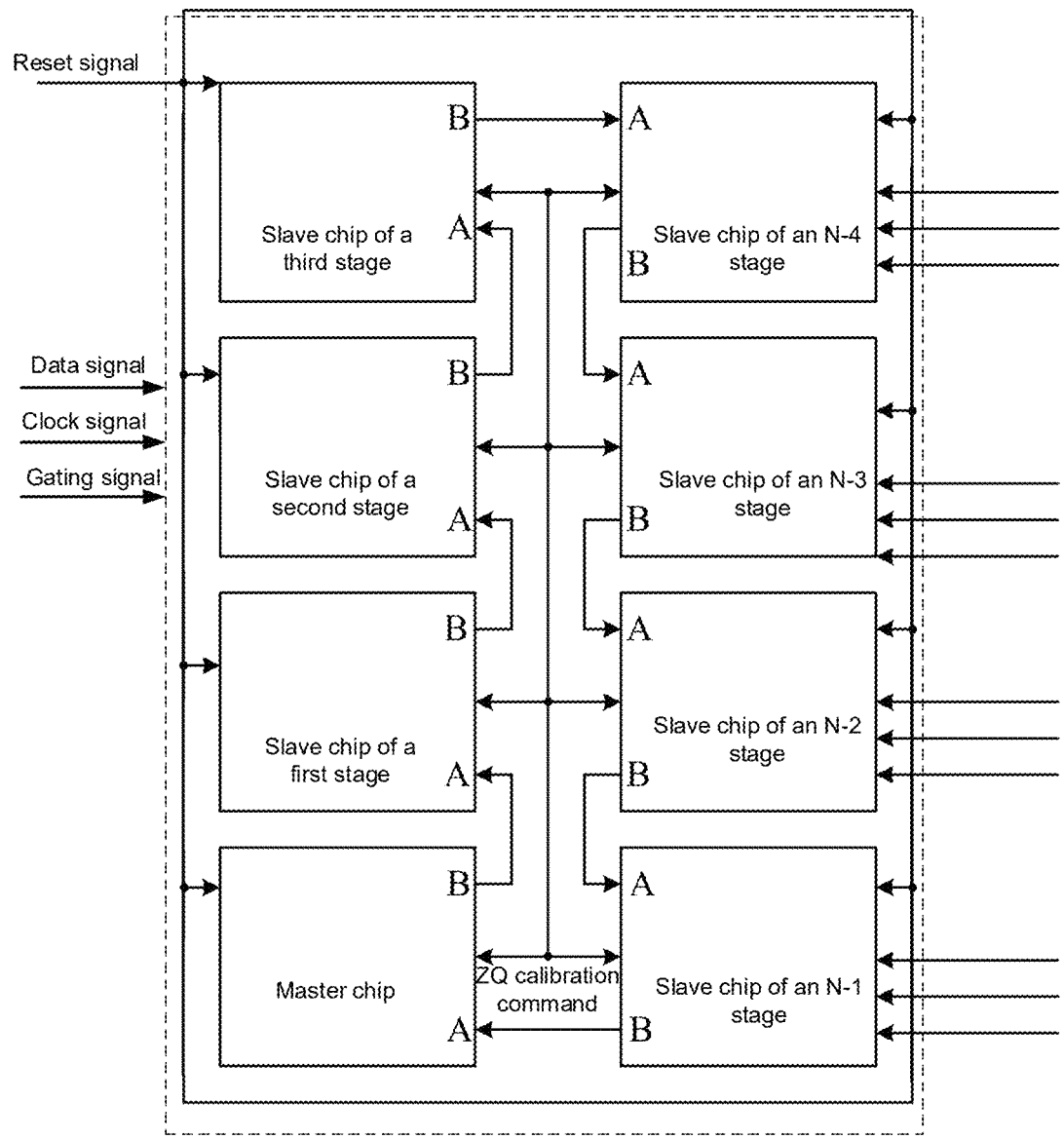
FIG. 2 is a schematic structural diagram of a second single-loop memory device according to an embodiment of the present disclosure.
Figure 3:
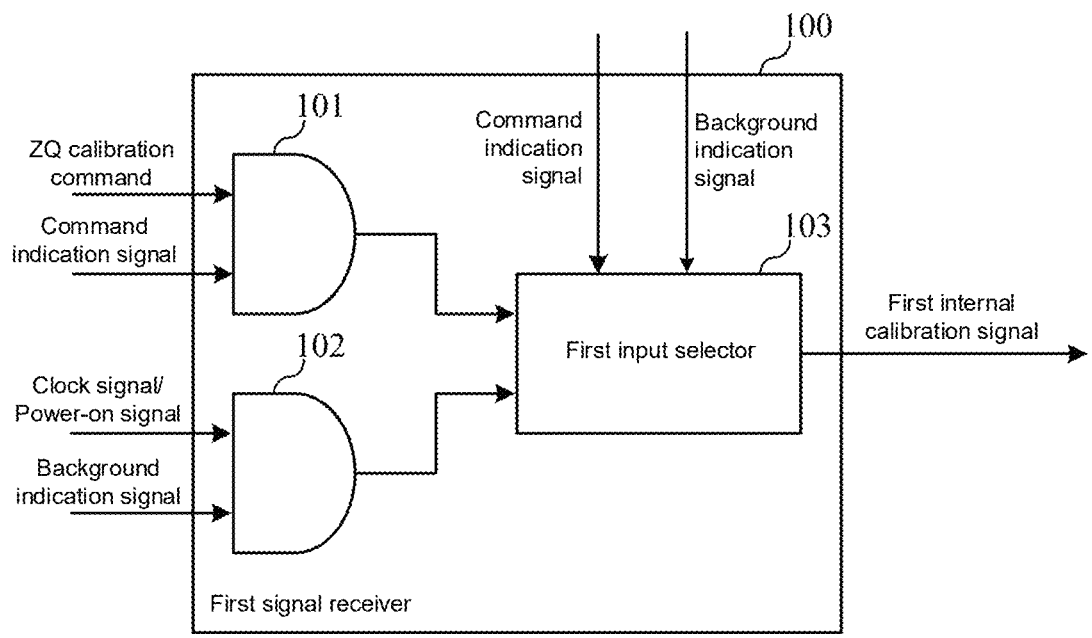
FIG. 3 is a schematic structural diagram of a first signal receiver according to an embodiment of the present disclosure.
Figure 4:
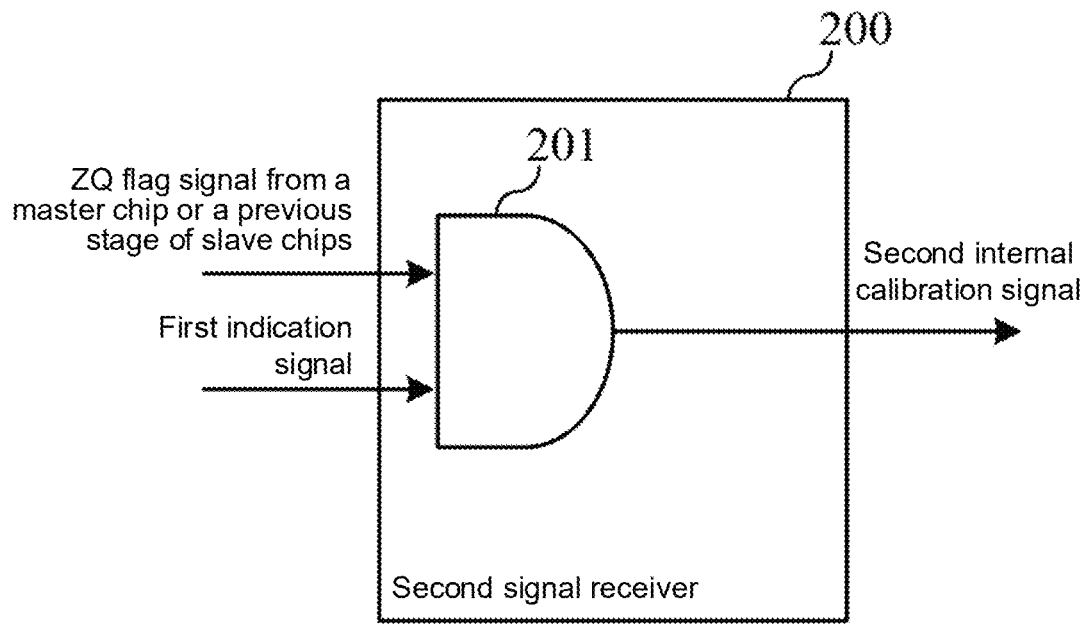
FIG. 4 is a schematic structural diagram of a second signal receiver according to an embodiment of the present disclosure.
Figure 5:
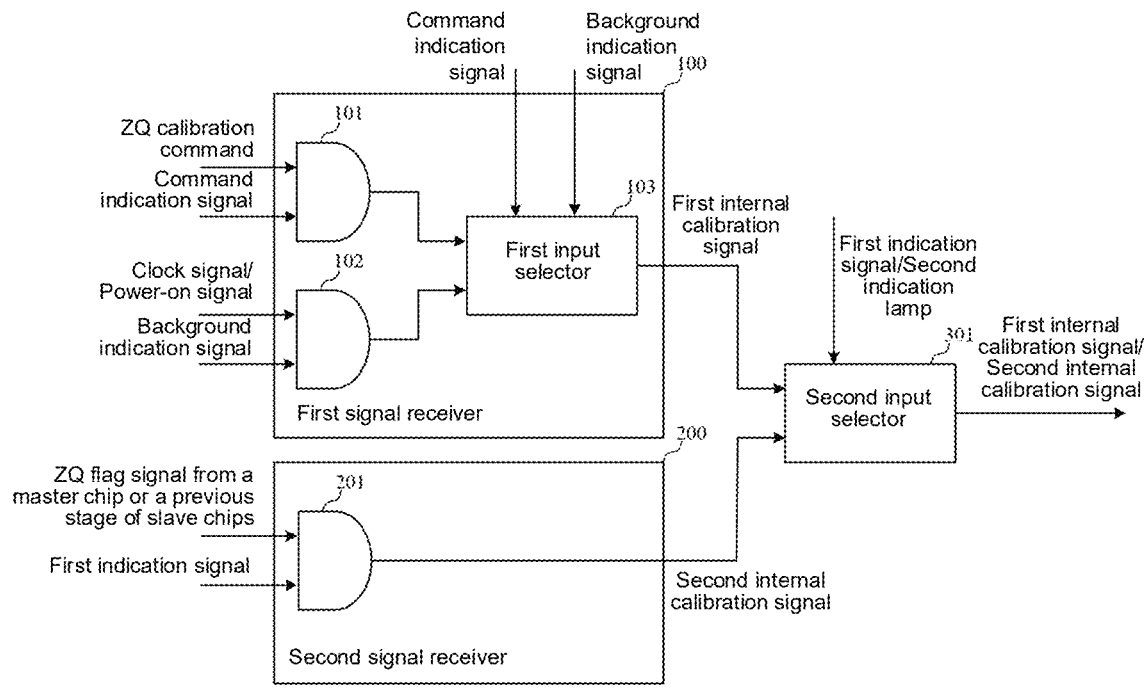
FIG. 5 is a schematic structural diagram of integration of a first signal receiver and a second signal receiver according to an embodiment of the present disclosure.

FIG. 1 is a schematic structural diagram of a first single-loop memory device according to this embodiment. FIG. 2 is a schematic structural diagram of a second single-loop memory device according to this embodiment. FIG. 3 is a schematic structural diagram of a first signal receiver according to this embodiment. FIG. 4 is a schematic structural diagram of a second signal receiver according to this embodiment. FIG. 5 is a schematic structural diagram of integration of a first signal receiver and a second signal receiver according to this embodiment. The structure of the single-loop memory device according to this embodiment is described in detail below with reference to the accompanying drawings, and the details are as follows:

Referring to FIG. 1, the single-loop memory device is applied to a memory device having a single calibration resistor, and includes:

a master chip and a plurality of cascaded slave chips, where the master chip and the slave chips are commonly connected to a same calibration resistor.

The master chip and the slave chips are each provided with a first transmission terminal A and a second transmission terminal B which are configured to transmit a ZQ flag signal.

It should be noted that the "cascading" mentioned above means that: the plurality of slave chips are respectively a slave chip of a first stage, a slave chip of a second stage . . . a slave chip of an (M−1)-th stage and a slave chip of an M-th stage, which are connected end to end. The second transmission terminal B of the master chip is connected to the first transmission terminal A of the slave chip of the first stage, and the second transmission terminal B of the slave chip of each stage is connected to the first transmission terminal A of the slave chip of a next stage.

A first signal receiver is provided in the master chip, and a second signal receiver is provided in the slave chip.

In some embodiments, the first signal receiver is configured to receive, by a ZQ signal terminal, a ZQ calibration command provided by a memory, the master chip starts calibration based on the ZQ calibration command, the ZQ flag signal is sent by the second transmission terminal B after the master chip completes the calibration, and the ZQ flag signal indicates that a current chip has used the calibration resistor for calibration. The second signal receiver is configured to receive the ZQ flag signal by the first transmission terminal A, the slave chip starts the calibration based on the ZQ flag signal, and the ZQ flag signal is sent by the second transmission terminal B after a current slave chip completes the calibration.

In the single-loop memory device provided in this embodiment, a plurality of chips are configured as one master chip and a plurality of slave chips. The master chip performs ZQ calibration by the calibration resistor based on the ZQ calibration command provided by the memory. After the master chip completes the ZQ calibration by the calibration resistor, the ZQ flag signal is sent to the cascaded slave chips, and the cascaded slave chips sequentially perform the ZQ calibration by the calibration resistor based on the ZQ flag signal, thereby realizing a plurality of chips, theoretically having no quantitative limitation, sharing the ZQ calibration resistor to perform the ZQ calibration.

It should be noted that the content "the first signal receiver is configured to receive, by a ZQ signal terminal, a ZQ calibration command provided by a memory, the master chip starts calibration based on the ZQ calibration command" mentioned above is a calibration logic of the master chip in the command mode. In the background mode, the first signal receiver is configured to receive, by the ZQ signal terminal, a clock signal or a power-on signal provided by the memory, and the master chip starts the calibration based on the clock signal or the power-on signal.

For the master chip and the slave chips shown in FIG. 1, the master chip and the slave chips are configured to perform chip resetting according to a reset signal, select a target chip according to a gating signal to enable the target chip, and write or read data according to the clock signal and a data signal. It should be noted that the reset signal, the data signal, the clock signal and the gating signal shown in FIG. 1 embody the working schemes of the master chip and the slave chips, and do not limit the structure of the single-loop memory device.

In some embodiments, referring to FIG. 3, the first signal receiver 100 includes: a first AND gate 101 having one input terminal configured to receive the ZQ calibration command and the other input terminal configured to receive a command indication signal, where the command indication signal indicates that the memory operates in a command mode; a second AND gate 102 having one input terminal configured to receive a clock signal or a power-on signal and the other input terminal configured to receive a background indication signal, where the background indication signal indicates that the memory operates in a background mode; and a first input selector 103 having a first input terminal connected to an output terminal of the first AND gate 101, a second input terminal connected to an output terminal of the second AND gate 102, a first selection terminal configured to receive the command indication signal or the background indication signal, and a first output terminal configured to output a first internal calibration signal, where the first internal calibration signal is configured to instruct the master chip to perform the calibration, and the first input selector 103 is configured to connect the first input terminal to the first output terminal based on the command indication signal, or connect the second input terminal to the first output terminal based on the background indication signal.

In some embodiments, when the memory is in the command mode, the command indication signal is provided to the first signal receiver 100 of the master chip, and the first input selector 103 connects the first input terminal to the first output terminal based on the command indication signal. At this time, the first signal receiver 100 provides the first internal calibration signal based on the output of the first AND gate 101. That is, when the first signal receiver 100 receives the ZQ calibration command, the first internal calibration signal is generated, thereby controlling the master chip to perform the ZQ calibration. When the memory is in the background mode, the background indication signal is provided to the first signal receiver 100 of the master chip, and the first input selector 103 connects the second input terminal to the first output terminal based on the background indication signal. At this time, the first signal receiver 100 provides the first internal calibration signal based on the output of the second AND gate 102. That is, when the first signal receiver 100 receives the clock signal or the power-on signal, the first internal calibration signal is generated, thereby controlling the master chip to perform the ZQ calibration.

In some embodiments, referring to FIG. 4, the second signal receiver 200 includes: a third AND gate 201 having one input terminal configured to receive the ZQ flag signal, the other input terminal configured to receive a first indication signal, and an output terminal configured to output a second internal calibration signal, where the first indication signal indicates that the current chip is the slave chip, and the second internal calibration signal is configured to instruct the slave chip to perform the calibration.

In some embodiments, the second signal receiver 200 is arranged in the slave chip. That is, the second signal receiver 200 continuously receives the first indication signal. At this time, when the second signal receiver 200 receives the ZQ flag signal, then the second internal calibration signal is generated, and the slave chip is controlled to perform the ZQ calibration.

In the structure of the single-loop memory device shown in FIG. 1, only the master chip receives the ZQ calibration command. The master chip is integrated with the first signal receiver 100, and the slave chip is integrated with the second signal receiver 200, such that there is a difference between the master chip and the slave chip. In some embodiments, the master chip and the slave chip have the same structure. At this time, the slave chip also needs to receive the ZQ calibration command. Referring to FIG. 2, at this time, the master chip further includes the second signal receiver 200, and the slave chip further includes the first signal receiver 100. Still referring to FIG. 5, the master chip and the slave chip each further include: a second input selector 301 having a third input terminal connected to the first output terminal, a fourth input terminal connected to an output terminal of the third AND gate 201, a second selection terminal configured to receive the first indication signal or a second indication signal, and a second output terminal configured to output the first internal calibration command or the second internal calibration command, where the second indication signal indicates that the current chip is the master chip, and the second input selector 301 is configured to connect the fourth input terminal to the second output terminal based on the first indication signal, or connect the third input terminal to the second output terminal based on the second indication signal.

In some embodiments, the second input selector 301 selects to output signal based on the first indication signal and the second indication signal. Receiving the second indication signal indicates that the current chip is the master chip. The second input selector 301 selects to output an output signal of the first signal receiver 100. Receiving the first indication signal indicates that the current chip is the slave chip. The second input selector 301 selects to output an output signal of the second signal receiver 200.

In some embodiments, the second transmission terminal B of the slave chip of the last stage is connected to the first transmission terminal A of the master chip. After the slave chip of the last stage completes the calibration, the ZQ flag signal generated by the slave chip of the last stage is transmitted to the master chip. When the master chip receives the ZQ flag signal, it is proved that all the chips complete the ZQ calibration, and the memory can perform a next operation. The ZQ flag signal is returned back to the master chip by the slave chip of the last stage, prompting that all the chips complete the ZQ calibration, thereby facilitating the design of memory circuit and signal timing.

Referring to FIG. 1 and FIG. 2, in this embodiment, the master chip and the slave chips are arranged in an array of two columns and N/2 rows, and the master chip is arranged at a position of a first column and an N/2-th row, where N−1 is the number of the slave chips, and N is an even number. In other embodiments, based on the number of the master chip and the slave chips and a layout area to be set, the master chip and the slave chips are arranged in an array of i columns and j rows, and at this time, the master chip is arranged at a position of the first column and the j-th row.

In some embodiments, the master chip and the slave chips are packaged in a same memory device. In some embodiments, the master chip and some of the slave chips are packaged in different memory devices, and connection between the first transmission terminal A and the second transmission terminal B packaged in different memory devices is set through wired or wireless interconnection between the memory devices.

According to this embodiment, the plurality of chips are configured as one master chip and a plurality of slave chips. The master chip performs ZQ calibration by the calibration resistor based on the ZQ calibration command provided by the memory. After the master chip completes the ZQ calibration by the calibration resistor, the ZQ flag signal is sent to the cascaded slave chips, and the cascaded slave chips sequentially perform the ZQ calibration by the calibration resistor based on the ZQ flag signal, thereby realizing a plurality of chips, theoretically having no quantitative limitation, sharing the ZQ calibration resistor to perform the ZQ calibration.

It should be noted that in this embodiment, a flag bit indicates whether a loop where the master chip is located is in a ZQ calibration state. For example, when the master chip receives the ZQ calibration command or receives the ZQ flag signal for the first time, the flag bit is in a first state. Correspondingly, after the master chip having the flag bit in the first state receives the ZQ flag signal, the flag bit is in a second state. In addition, when the ZQ calibration time is limited, the chips sharing the ZQ calibration resistor are also limited. The longer it takes each chip to perform the ZQ calibration, the fewer chips share the ZQ calibration resistor. In addition, the features disclosed in the single-loop memory device according to above embodiment may be combined freely without conflicts to obtain a new embodiment of the single-loop memory device.

Another embodiment of the present disclosure provides a ZQ calibration method, applied to the single-loop memory device according to the above embodiment, thereby realizing a plurality of chips, theoretically having no quantitative limitation, sharing the ZQ calibration resistor to perform the ZQ calibration.

Figure 6:
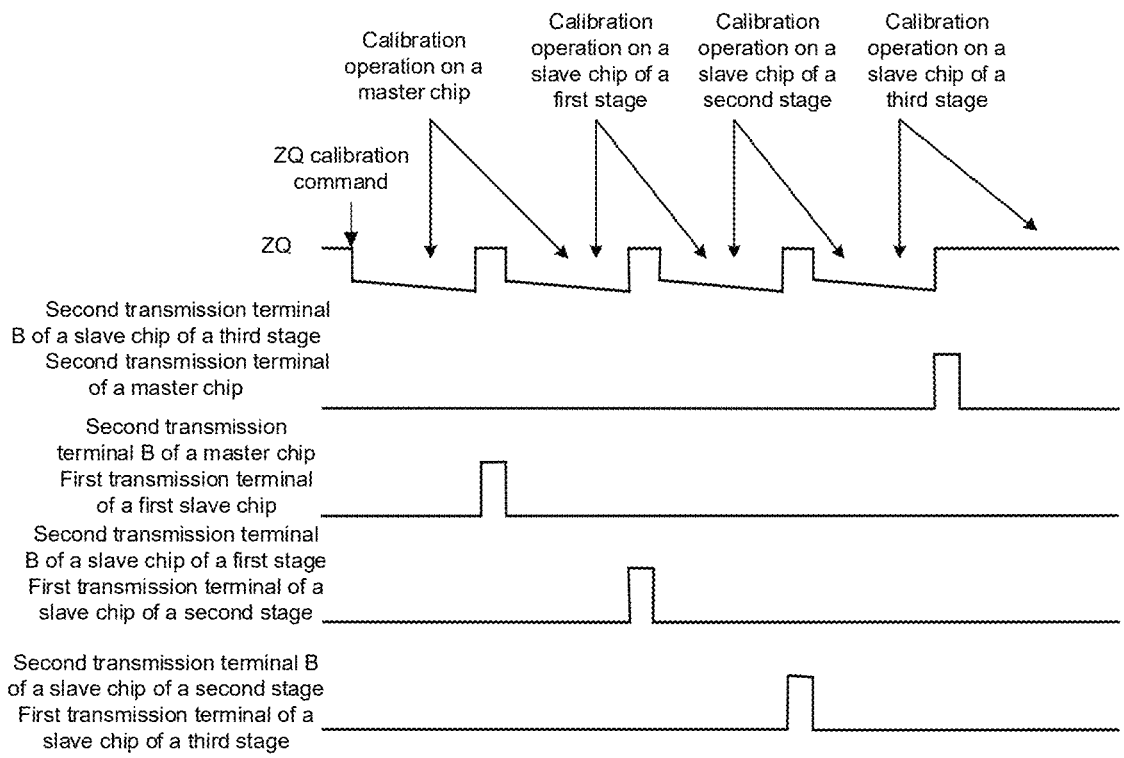
FIG. 6 is a schematic diagram of timing of ZQ calibration performed by a single-loop memory device according to another embodiment of the present disclosure.

FIG. 6 is a schematic diagram of timing of ZQ calibration performed by a single-loop memory device according to this embodiment. The ZQ calibration method according to this embodiment is described in detail below with reference to the accompanying drawings, and the details may be as follows:

Referring to FIG. 6, the ZQ calibration method includes: in a command mode, obtaining a ZQ calibration command applied outside a memory device; performing a first calibration operation on a master chip in response to the ZQ calibration command; after the first calibration operation is completed, transmitting a ZQ flag signal to a slave chip of a first stage, and performing a second calibration operation on the master chip; performing the first calibration operation on the slave chip of the first stage in response to the ZQ flag signal; after the first calibration operation on the slave chip of the first stage is completed, transmitting the ZQ flag signal to a slave chip of a next stage, and performing the second calibration operation on the slave chip of the first stage until a slave chip of a last stage completes the first calibration operation; and completing the second calibration operation on the slave chip of the last stage.

It should be noted that the schematic diagram of timing of ZQ calibration shown in FIG. 6 is described by taking three stages of slave chips as an example, which is merely for those skilled in the art to know the realization of ZQ calibration in the embodiment of the present disclosure, and does not limit this embodiment. Based on the illustration of FIG. 6 and the ZQ calibration method mentioned above, those skilled in the art can continue to derive the timing in FIG. 6 to the situation applicable to K slave chips.

In some embodiments, while completing the second calibration operation on the slave chip of the last stage, the ZQ calibration method further includes: transmitting the ZQ flag signal to the master chip; after the slave chip of the last stage completing the ZQ calibration, transmitting, to the master chip, the ZQ flag signal generated by the slave chip of the last stage, when the master chip receiving the ZQ flag signal, it is proved that all the chips complete the ZQ calibration and the memory can perform a next operation; and returning the ZQ flag signal to the master chip by the slave chip of the last stage, prompting that all the chips complete the ZQ calibration, thereby facilitating the design of memory circuit and signal timing.

It should be noted that in this embodiment, the first calibration operation is one of a pull-up calibration operation generating a pull-up calibration code and a pull-down calibration operation generating a pull-down calibration code, and the second calibration operation is the other one of the pull-up calibration operation and the pull-down calibration operation.

It should be noted that for the ZQ calibration method of the single-loop memory device, the calibration method of the memory device in the background mode is the same as that in the command mode mentioned above, which is not repeated in this embodiment. In addition, the features disclosed in the ZQ calibration method according to the above embodiment can be combined freely without conflicts, and a new embodiment of the ZQ calibration method can be obtained.

Another embodiment of the present disclosure provides a double-loop memory device. A new control circuit is designed to realize a plurality of chips, theoretically having no quantitative limitation, sharing the ZQ calibration resistor.

Figure 7:
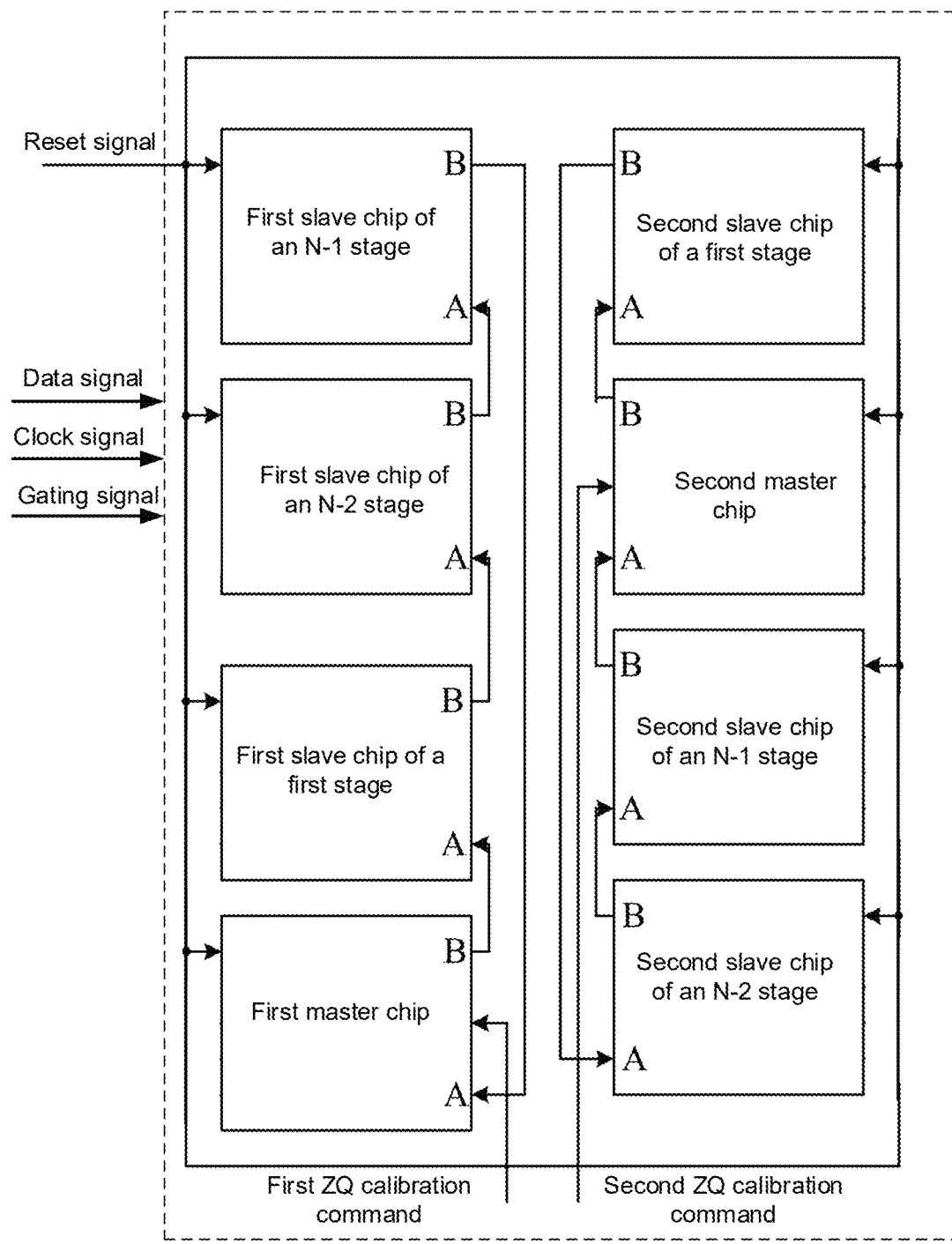
FIG. 7 is a schematic structural diagram of a first double-loop memory device according to another embodiment of the present disclosure.
Figure 8:
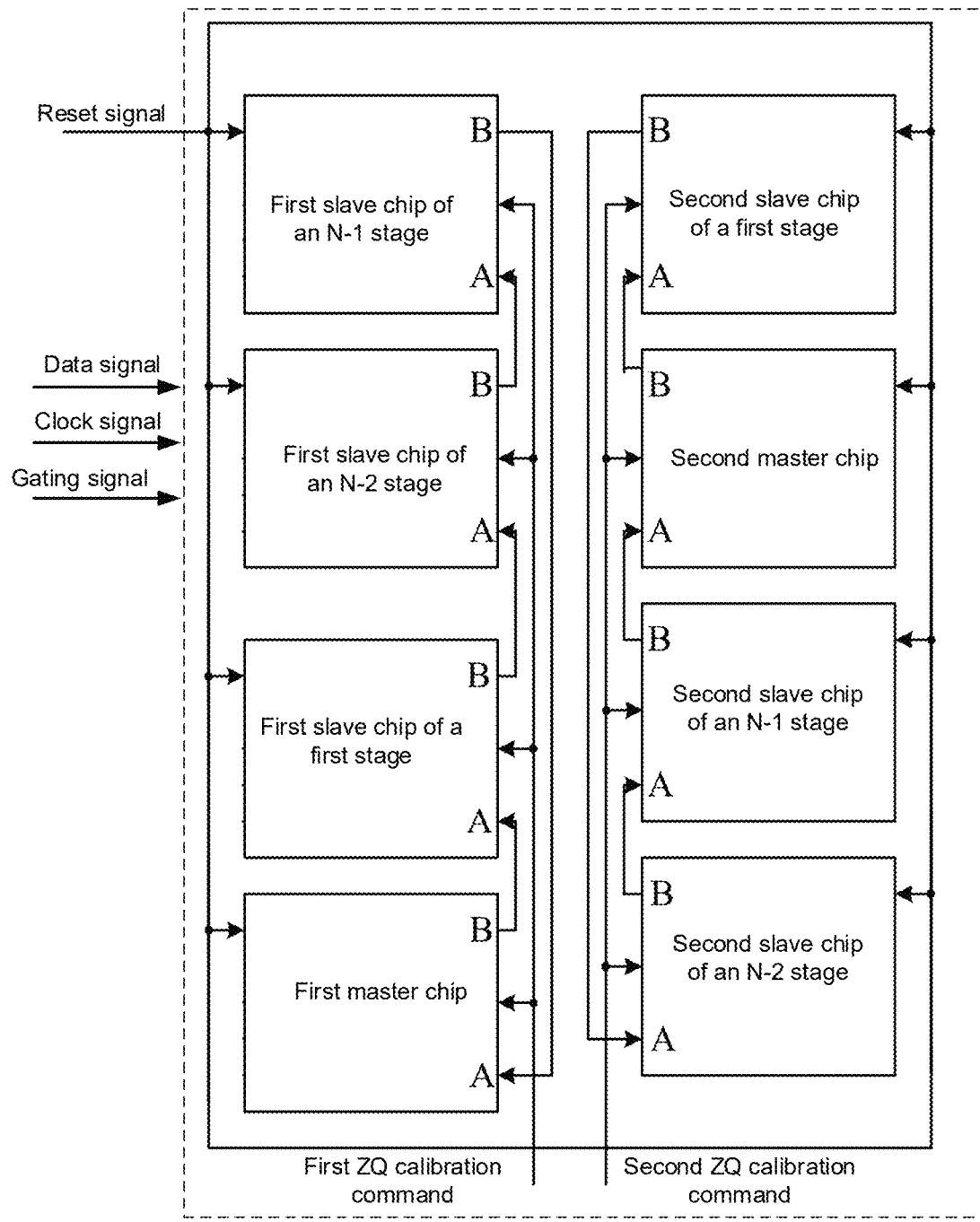
FIG. 8 is a schematic structural diagram of a second double-loop memory device according to another embodiment of the present disclosure.

FIG. 7 is a schematic structural diagram of a first double-loop memory device according to this embodiment. FIG. 8 is a schematic structural diagram of a second double-loop memory device according to this embodiment. The same part as the structure of the single-loop memory device is not repeated in this embodiment. The structure of the double-loop memory device according to this embodiment is described in detail below with reference to the accompanying drawings, and the details may be as follows:

Referring to FIG. 7 and FIG. 8, the double-loop memory device is applied to a memory device having two calibration resistors, and includes:

a first master chip, a plurality of cascaded first slave chips, a second master chip, and a plurality of cascaded second slave chips, where the first master chip and the first slave chips are commonly connected to a first calibration resistor, and the second master chip and the second slave chips are commonly connected to a second calibration resistor.

The first master chip, the first slave chips, the second master chip, and the second slave chips are each provided with a first transmission terminal A and a second transmission terminal B, where the first transmission terminal A and the second transmission terminal B are configured to transmit ZQ flag signals; the ZQ flag signals include a first ZQ flag signal and a second ZQ flag signal, where the first transmission terminals A and the second transmission terminals B of the first master chip and the first slave chips are configured to transmit the first ZQ flag signal, and the first transmission terminals A and the second transmission terminals B of the second master chip and the second slave chips are configured to transmit the second ZQ flag signal.

It should be noted that the "cascading" mentioned above means that: the plurality of slave chips are respectively a slave chip of a first stage, a slave chip of a second stage . . . a slave chip of an (M−1)-th stage and a slave chip of an M-th stage, which are connected end to end. The second transmission terminal B of the first master chip is connected to the first transmission terminal A of the first slave chip of a first stage, the second transmission terminal B of the first slave chip of each stage is connected to the first transmission terminal A of the first slave chip of a next stage, the second transmission terminal B of the second master chip is connected to the first transmission terminal A of the second slave chip of a first stage, and the second transmission terminal B of the second slave chip of each stage is connected to the first transmission terminal A of the second slave chip of a next stage.

A first signal receiver is provided in each of the first master chip and the second master chip, and a second signal receiver is provided in each of the first slave chip and the second slave chip.

In some embodiments, the first signal receiver is configured to receive, by a ZQ signal terminal, ZQ calibration commands provided by a memory; the ZQ calibration commands include a first ZQ calibration command and a second ZQ calibration command; the first master chip starts calibration based on the first ZQ calibration command, the first ZQ flag signal is sent by the second transmission terminal B after the first master chip completes the calibration, and the first ZQ flag signal indicates that the calibration resistors have been used by a current chip for calibration. The second signal receiver is configured to receive the first ZQ flag signal by the first transmission terminal A, the first slave chip starts the calibration based on the first ZQ flag signal, and the first ZQ flag signal is sent by the second transmission terminal B after a current first slave chip completes the calibration. The second master chip starts the calibration based on the second ZQ calibration command, the second ZQ flag signal is sent by the second transmission terminal B after the second master chip completes the calibration, and the second ZQ flag signal indicates that the calibration resistors have been used by the current chip for calibration. The second signal receiver is configured to receive the second ZQ flag signal by the first transmission terminal A, the second slave chip starts the calibration based on the second ZQ flag signal, and the second ZQ flag signal is sent by the second transmission terminal B after a current second slave chip completes the calibration.

In the double-loop memory device provided in this embodiment, a plurality of chips are configured as one first master chip, a plurality of first slave chips, one second master chip, and a plurality of second slave chips. The first master chip and the plurality of first slave chips perform the ZQ calibration by the first calibration resistor, and the second master chip and the plurality of second slave chips perform the ZQ calibration by the second calibration resistor. The master chip performs the ZQ calibration by the calibration resistor based on the ZQ calibration command provided by the memory. After the master chip completes the ZQ calibration by the calibration resistor, the ZQ flag signal is sent to the cascaded slave chips, and the cascaded slave chips sequentially perform the ZQ calibration by the calibration resistor based on the ZQ flag signal, thereby realizing a plurality of chips, theoretically having no quantitative limitation, sharing the ZQ calibration resistor to perform the ZQ calibration.

In some embodiments, referring to FIG. 3, the first signal receiver 100 includes: a first AND gate 101 having one input terminal configured to receive the ZQ calibration command and the other input terminal configured to receive a command indication signal, where the command indication signal indicates that the memory operates in a command mode; a second AND gate 102 having one input terminal configured to receive a clock signal or a power-on signal and the other input terminal configured to receive a background indication signal, where the background indication signal indicates that the memory operates in a background mode; and a first input selector 103 having a first input terminal connected to an output terminal of the first AND gate 101, a second input terminal connected to an output terminal of the second AND gate 102, a first selection terminal configured to receive the command indication signal or the background indication signal, and a first output terminal configured to output a first internal calibration signal, where the first internal calibration signal is configured to instruct the master chip to perform the calibration, and the first input selector 103 is configured to connect the first input terminal to the first output terminal based on the command indication signal, or connect the second input terminal to the first output terminal based on the background indication signal.

In some embodiments, referring to FIG. 4, the second signal receiver 200 includes: a third AND gate 201 having one input terminal configured to receive the ZQ flag signal, the other input terminal configured to receive a first indication signal, and an output terminal configured to output a second internal calibration signal, where the first indication signal indicates that the current chip is the slave chip, and the second internal calibration signal is configured to instruct the slave chip to perform the calibration.

In the structure of the double-loop memory device shown in FIG. 7, only the first master chip receives the first ZQ calibration command, and the second master chip receives the second ZQ calibration command. The first master chip and the second master chip are integrated with the first signal receiver 100, and the first slave chips and the second slave chips are integrated with the second signal receiver 200. In some embodiments, the first master chip, the second master chip, the first slave chip, and the second slave chip have the same structure. At this time, the first slave chip also needs to receive the first ZQ calibration command, and the second slave chip also needs to receive the second ZQ calibration command. Referring to FIG. 8, at this time, the master chip further includes the second signal receiver 200, and the slave chip further includes the first signal receiver 100. Still referring to FIG. 5, the master chip and the slave chip each further include: a second input selector 301 having a third input terminal connected to the first output terminal, a fourth input terminal connected to an output terminal of the third AND gate 201, a second selection terminal configured to receive the first indication signal or a second indication signal, and a second output terminal configured to output the first internal calibration command or the second internal calibration command, where the second indication signal indicates that the current chip is the master chip, and the second input selector 301 is configured to connect the fourth input terminal to the second output terminal based on the first indication signal, or connect the third input terminal to the second output terminal based on the second indication signal.

In some embodiments, the second transmission terminal B of the first slave chip of a last stage is connected to the first transmission terminal A of the first master chip, and the second transmission terminal B of the second slave chip of a last stage is connected to the first transmission terminal A of the second master chip.

Referring to FIG. 7 and FIG. 8, in this embodiment, the number of the first slave chips is equal to that of the second slave chips. That is, the numbers of chips performing the ZQ calibration on the basis of the first calibration resistor and the numbers of chips performing the ZQ calibration on the basis of the second calibration resistor are equal, to synchronize the calibration timing of the ZQ calibration performed on the basis of the first calibration resistor and the calibration timing of the ZQ calibration performed on the basis of the second calibration resistor. In other embodiments, the number of the first slave chips may also be set to be different from that of the second slave chips.

In addition, in this embodiment, the first master chip and the first slave chips are arranged in a first array of one column and N rows, and the first master chip is arranged at an N-th row; the second master chip and the second slave chips are arranged in a second array of one column and N rows, and the second master chip is arranged at an N/2-th row, where N−1 is the number of the first slave chips. In other embodiments, the chips can be arranged in an array of i columns and j rows based on the number of the chips and the layout area to be set. At this time, the first master chip is arranged at a position of a first column and a j-th row, and the second master chip is arranged at a position of an (i/2+1)-th column and a j/2-th row.

In some embodiments, the first master chip and the first slave chips are packaged in a same memory device, and the second master chip and the second slave chips are packaged in a same memory device. In some embodiments, the first master chip and the first slave chips are packaged in different memory devices, the second master chip and the second slave chips are packaged in different memory devices, and connection between the first transmission terminal A and the second transmission terminal B packaged in different memory devices is set through wired or wireless interconnection between the memory devices.

According to this embodiment, a plurality of chips are configured as one first master chip, a plurality of first slave chips, one second master chip, and a plurality of second slave chips. The first master chip and the plurality of first slave chips perform the ZQ calibration by the first calibration resistor, and the second master chip and the plurality of second slave chips perform the ZQ calibration by the second calibration resistor. The master chip performs the ZQ calibration by the calibration resistor based on the ZQ calibration command provided by the memory. After the master chip completes the ZQ calibration by the calibration resistor, the ZQ flag signal is sent to the cascaded slave chips, and the cascaded slave chips sequentially perform the ZQ calibration by the calibration resistor based on the ZQ flag signal, thereby realizing a plurality of chips, theoretically having no quantitative limitation, sharing the ZQ calibration resistor to perform the ZQ calibration.

It should be noted that in this embodiment, a flag bit indicates whether a loop where the master chip is located is in a ZQ calibration state. For example, when the master chip receives the ZQ calibration command or receives the ZQ flag signal for the first time, the flag bit is in a first state. Correspondingly, after the master chip having the flag bit in the first state receives the ZQ flag signal, the flag bit is in a second state. In addition, when the ZQ calibration time is limited, the chips sharing the ZQ calibration resistor are also limited. The longer it takes each chip to perform the ZQ calibration, the fewer chips share the ZQ calibration resistor. In addition, the features disclosed in the double-loop memory device according to above embodiment may be combined freely without conflicts to obtain a new embodiment of the double-loop memory device.

Another embodiment of the present disclosure provides a ZQ calibration method, applied to the double-loop memory device according to the above embodiment, thereby realizing a plurality of chips, theoretically having no quantitative limitation, sharing the ZQ calibration resistor to perform the ZQ calibration.

The ZQ calibration method includes: in a command mode, obtaining a first ZQ calibration command and a second ZQ calibration command applied outside a memory device; performing a first calibration operation on a first master chip in response to the first ZQ calibration command; after the first calibration operation is completed, transmitting a first ZQ flag signal to a first slave chip of a first stage, and performing a second calibration operation on the first master chip; performing the first calibration operation on the first slave chip of the first stage in response to the first ZQ flag signal; after the first calibration operation on the first slave chip of the first stage is completed, transmitting the first ZQ flag signal to a first slave chip of a next stage, and performing the second calibration operation on the first slave chip of the first stage until a first slave chip of a last stage completes the first calibration operation; completing the second calibration operation on the first slave chip of the last stage; performing the first calibration operation on a second master chip in response to the second ZQ calibration command; after the first calibration operation is completed, transmitting a second ZQ flag signal to a second slave chip of a first stage, and performing the second calibration operation on the second master chip; performing the first calibration operation on the second slave chip of the first stage in response to the second ZQ flag signal; after the first calibration operation on the second slave chip of the first stage is completed, transmitting the second ZQ flag signal to a second slave chip of a next stage, and performing the second calibration operation on the second slave chip of the first stage until a second slave chip of a last stage completes the first calibration operation; and completing the second calibration operation on the second slave chip of the last stage.

In view of the above commentary, the first master chip and the first slave chips are calibrated on the basis of the first calibration resistor, and the second master chip and the second slave chip are calibrated on the basis of the second calibration resistor. That is, the calibration between the first master chip and the first slave chips and the calibration between the second master chip and the second slave chips are independent of each other and do not influence each other. In some embodiments, the first calibration operation on the first master chip and the first calibration operation on the second master chip are performed at the same time. That is, the ZQ calibration operation on the first master chip and the ZQ calibration operation on the second master chip are performed synchronously. In other embodiments, the ZQ calibration operation on the first master chip and the ZQ calibration operation on the second master chip may be performed asynchronously. That is, the ZQ calibration operation on the first master chip and the ZQ calibration operation on the second master chip are performed at different time. Furthermore, in some embodiments, the first calibration operation on the second master chip can be set after the completion of the second calibration operation on the first slave chip of the last stage.

In some embodiments, while completing the second calibration operation on the slave chip of the last stage, the ZQ calibration method further includes: transmitting the ZQ flag signal to the master chip; after the slave chip of the last stage completing the ZQ calibration, transmitting, to the master chip, the ZQ flag signal generated by the slave chip of the last stage; when the master chip receiving the ZQ flag signal, it is proved that all the chips complete the ZQ calibration and the memory can perform a next operation; and returning the ZQ flag signal to the master chip by the slave chip of the last stage, prompting that all the chips complete the ZQ calibration, thereby facilitating the design of memory circuit and signal timing.

It should be noted that in this embodiment, the first calibration operation is one of a pull-up calibration operation generating a pull-up calibration code and a pull-down calibration operation generating a pull-down calibration code, and the second calibration operation is the other one of the pull-up calibration operation and the pull-down calibration operation.

It should be noted that for the ZQ calibration method of the single-loop memory device, the calibration method of the memory device in the background mode is the same as that in the command mode mentioned above, which is not repeated in this embodiment. In addition, the features disclosed in the ZQ calibration method according to the above embodiment can be combined freely without conflicts, and a new embodiment of the ZQ calibration method can be obtained.

The embodiments or implementations of this specification are described in a progressive manner, and each embodiment focuses on differences from other embodiments. The same or similar parts between the embodiments may refer to each other.

In the description of this specification, the description referring to terms such as "an embodiment", "an exemplary embodiment", "some implementations", "a schematic implementation", and "an example" means that the specific feature, structure, material, or characteristic described in combination with the implementation(s) or example(s) is included in at least one implementation or example of the present disclosure.

In this specification, the schematic expression of the above terms does not necessarily refer to the same implementation or example. Moreover, the described specific feature, structure, material or characteristic may be combined in an appropriate manner in any one or more implementations or examples.

It should be noted that in the description of the present disclosure, the terms such as "center", "top", "bottom", "left", "right", "vertical", "horizontal", "inner" and "outer" indicate the orientation or position relationships based on the accompanying drawings. These terms are merely intended to facilitate description of the present disclosure and simplify the description, rather than to indicate or imply that the mentioned apparatus or element must have a specific orientation and must be constructed and operated in a specific orientation. Therefore, these terms should not be construed as a limitation to the present disclosure.

It can be understood that the terms such as "first" and "second" used in the present disclosure can be used to describe various structures, but these structures are not limited by these terms. Instead, these terms are merely intended to distinguish one structure from another.

The same elements in one or more accompanying drawings are denoted by similar reference numerals. For the sake of clarity, various parts in the accompanying drawings are not drawn to scale. In addition, some well-known parts may not be shown. For the sake of brevity, a structure obtained by implementing a plurality of steps may be shown in one figure. In order to understand the present disclosure more clearly, many specific details of the present disclosure, such as the structure, material, size, processing process, and technology of the device, are described below. However, as those skilled in the art can understand, the present disclosure may not be implemented according to these specific details.

Finally, it should be noted that the above embodiments are merely intended to explain the technical solutions of the present disclosure, rather than to limit the present disclosure. Although the present disclosure is described in detail referring to the above embodiments, those skilled in the art should understand that they may still modify the technical solutions described in the above embodiments, or make equivalent substitutions of some or all of the technical features recorded therein, without deviating the essence of the corresponding technical solutions from the scope of the technical solutions of the embodiments of the present disclosure.

INDUSTRIAL APPLICABILITY

In the single-loop memory device, the double-loop memory device, and the ZQ calibration method provided in the embodiments of the present disclosure, a plurality of chips are configured as one master chip and a plurality of slave chips. The master chip performs ZQ calibration by the calibration resistor based on the ZQ calibration command provided by the memory. After the master chip completes the ZQ calibration by the calibration resistor, the ZQ flag signal is sent to the cascaded slave chips, and the cascaded slave chips sequentially perform the ZQ calibration by the calibration resistor based on the ZQ flag signal, thereby realizing a plurality of chips, theoretically having no quantitative limitation, sharing the ZQ calibration resistor to perform the ZQ calibration.

The invention claimed is:

1. A single-loop memory device, applied to a memory device having a single calibration resistor, and comprising:
a master chip and a plurality of cascaded slave chips, wherein the master chip and the slave chips are commonly connected to a same calibration resistor; and
the master chip and each of the slave chips are each provided with a first transmission terminal and a second transmission terminal, and the first transmission terminal of the master chip is configured to receive a ZQ flag signal output by a slave chip in the last stage, the first transmission terminal of the slave chip is configured to receive the ZQ flag signal output by the master chip or the slave chip in the previous stage, the second transmission terminal of the master chip and the slave chip is configured to output the ZQ flag signal, the ZQ flag signal indicates that a current chip has used the calibration resistor for calibration, and the ZQ flag signal output by the master chip and each of ZQ flag signal output by the slave chips are different, wherein
the second transmission terminal of the master chip is connected to the first transmission terminal of the slave chip of a first stage, and the second transmission terminal of the slave chip of each stage is connected to the first transmission terminal of the slave chip of a next stage; and
a first signal receiver is provided in the master chip, and a second signal receiver is provided in the slave chip, the first signal receiver is configured to receive, by a ZQ signal terminal, a ZQ calibration command provided by a memory, the master chip starts calibration based on the ZQ calibration command, the ZQ flag signal corresponding to the master chip is sent by the second transmission terminal of the master chip after the master chip completes the calibration; and
the second signal receiver is configured to receive the ZQ flag signal output by the master chip or the slave chip in the previous stage through the first transmission terminal, the slave chip starts the calibration based on the ZQ flag signal, and the ZQ flag signal corresponding to a current slave chip is sent by the second transmission terminal of the current slave chip after the current slave chip completes the calibration.

2. The single-loop memory device according to claim 1, wherein
the first signal receiver comprises:
a first AND gate, having one input terminal configured to receive the ZQ calibration command and a second input terminal configured to receive a command indication signal, wherein the command indication signal indicates that the memory operates in a command mode;
a second AND gate, having one input terminal configured to receive a clock signal or a power-on signal and a second input terminal configured to receive a background indication signal, wherein the background indication signal indicates that the memory operates in a background mode; and
a first input selector, having a first input terminal connected to an output terminal of the first AND gate, a second input terminal connected to an output terminal of the second AND gate, a first selection terminal configured to receive the command indication signal or the background indication signal, and a first output terminal configured to output a first internal calibration signal, wherein the first internal calibration signal is configured to instruct the master chip to perform the calibration, and the first input selector is configured to connect the first input terminal to the first output terminal based on the command indication signal, or connect the second input terminal to the first output terminal based on the background indication signal; and
the second signal receiver comprises:

a third AND gate, having one input terminal configured to receive the ZQ flag signal output by the master chip or the slave chip in the previous stage, a second input terminal configured to receive a first indication signal, and an output terminal configured to output a second internal calibration signal, wherein the first indication signal indicates that the current chip is the slave chip, and the second internal calibration signal is configured to instruct the slave chip to perform the calibration.

3. The single-loop memory device according to claim 2, wherein the master chip further comprises the second signal receiver, and the slave chip further comprises the first signal receiver; and the master chip and the slave chip each further comprise:
a second input selector, having a third input terminal connected to the first output terminal, a fourth input terminal connected to the output terminal of the third AND gate, a second selection terminal configured to receive the first indication signal or a second indication signal, and a second output terminal configured to output the first internal calibration signal and the second internal calibration signal, wherein the second indication signal indicates that the current chip is the master chip, and the second input selector is configured to connect the fourth input terminal to the second output terminal based on the first indication signal, or connect the third input terminal to the second output terminal based on the second indication signal.

4. The single-loop memory device according to claim 1, wherein the master chip and the slave chips are packaged in a same memory device.

5. The single-loop memory device according to claim 1, wherein the master chip and some of the slave chips are packaged in different memory devices, and connection between the first transmission terminal and the second transmission terminal packaged in different memory devices is set through wired or wireless interconnection between the memory devices.

6. The single-loop memory device according to claim 1, wherein the master chip and the slave chips are arranged in an array of two columns and N/2 rows, and the master chip is arranged at a position of a first column and an N/2-th row, wherein N−1 is a number of the slave chips, and N is an even number.

* * * * *